Oct. 3, 1967    P. B. SHUTT ETAL    3,344,944
MASTER CYLINDER CAP
Filed May 10, 1965    2 Sheets-Sheet 1
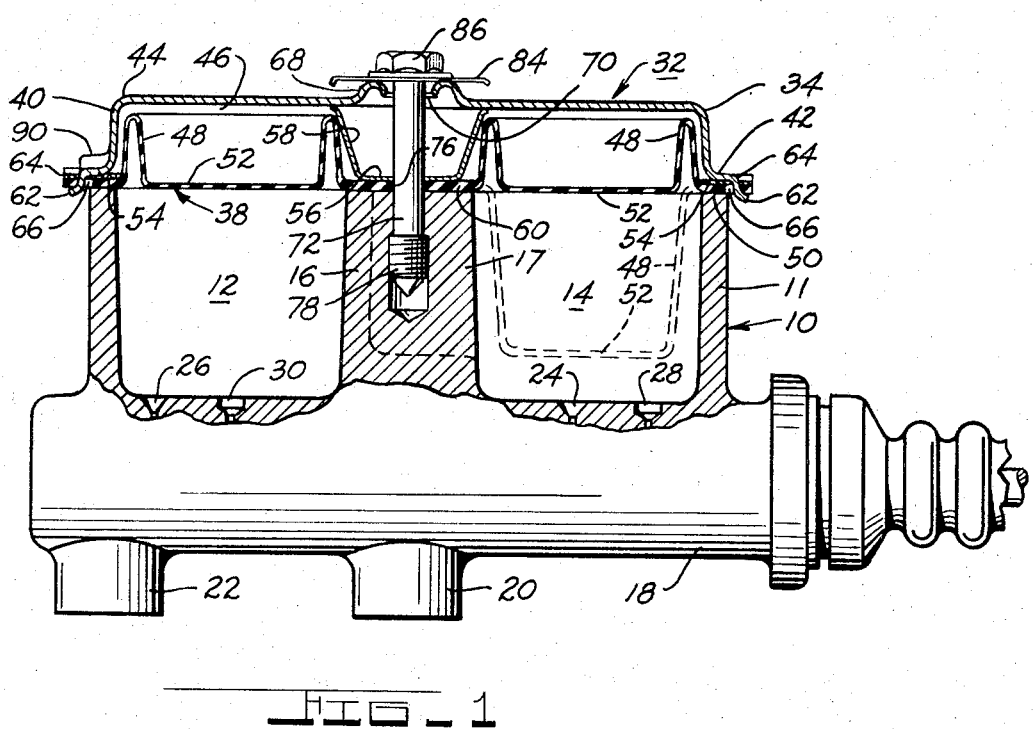
FIG_1
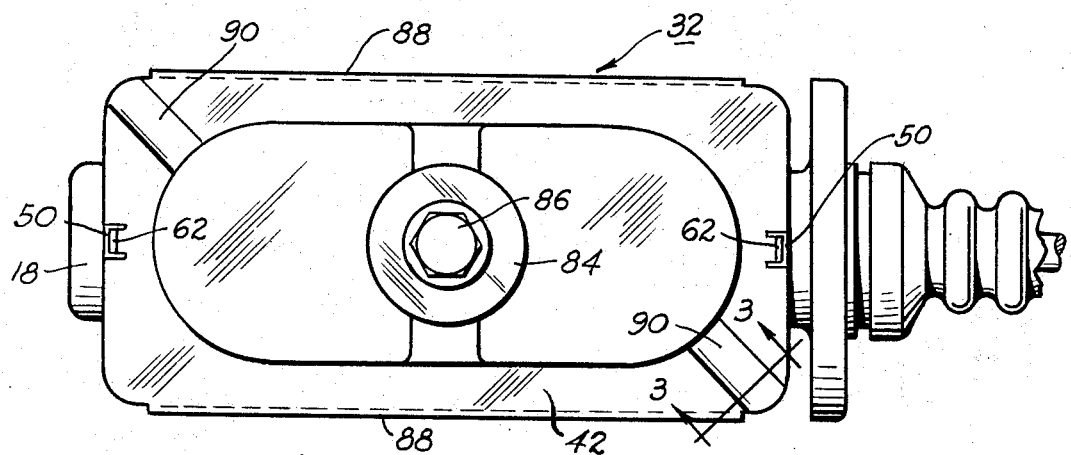
FIG_2
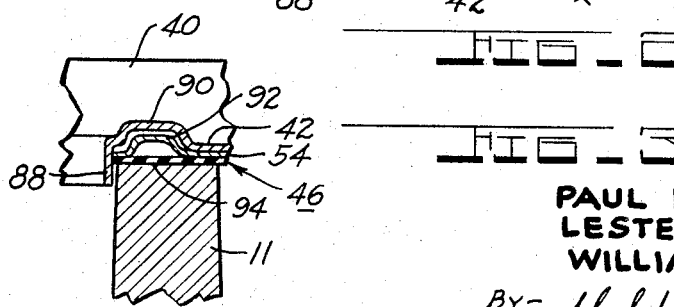
FIG_3
INVENTORS
PAUL B. SHUTT.
LESTER J. LARSEN
WILLIAM E. FERRELL.
BY Sheldon F. Raines
ATTORNEY.

Oct. 3, 1967  P. B. SHUTT ETAL  3,344,944
MASTER CYLINDER CAP
Filed May 10, 1965  2 Sheets-Sheet 2
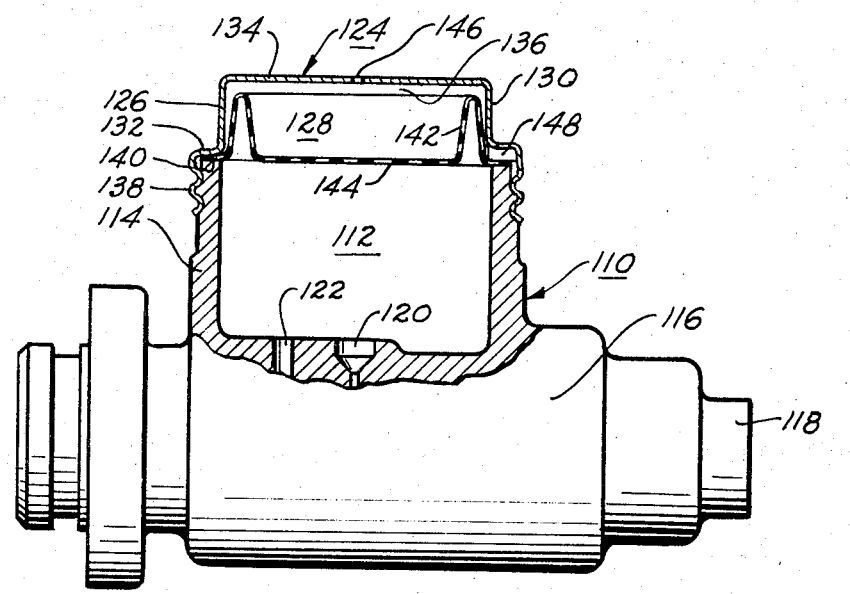
FIG_5
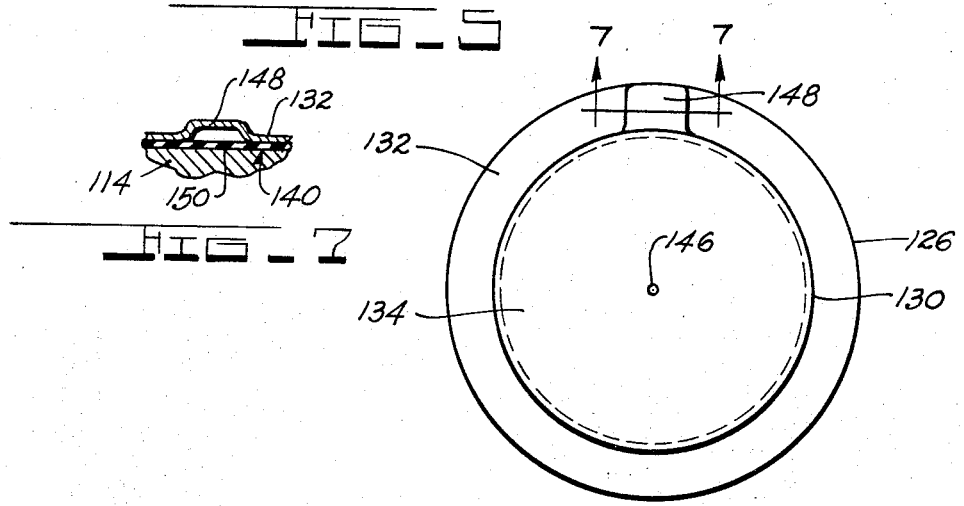
FIG_7
FIG_6
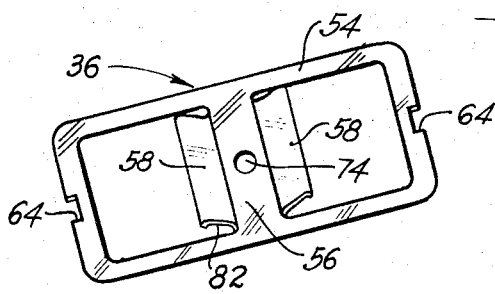
FIG_4
INVENTORS
PAUL B. SHUTT.
LESTER J. LARSEN.
WILLIAM E. FERRELL.
BY Sheldon F. Raies
ATTORNEY.

United States Patent Office 3,344,944
Patented Oct. 3, 1967

3,344,944
MASTER CYLINDER CAP
Paul B. Shutt, Lester J. Larsen, and William E. Ferrell, St. Joseph, Mich., assignors to The Bendix Corporation, St. Joseph, Mich., a corporation of Delaware
Filed May 10, 1965, Ser. No. 454,324
11 Claims. (Cl. 220—44)

ABSTRACT OF THE DISCLOSURE

A cap for a fluid reservoir in combination with a sealing member bridging the cavity of the reservoir underneath the cap, which cap is provided with at least one indentation above the sealing member to permit relief of pressures within the sealed cavity above atmospheric pressure.

---

This invention relates to a master cylinder cap and more particularly, a master cylinder cap providing means for relieving excess pressure build-up in a master cylinder reservoir.

It has been found that under certain circumstances air gets into the hydraulic brake system. The air will work itself out of the system by passing through the reservoir and escaping through a vent in the cap. However, with the advent of a diaphragm cap, the vent of the cap is sealed off from the reservoir thereby trapping the air in the reservoir resulting in the build up of pressure therein. This pressure build up could result in pressure being maintained on the hydraulic system thereby affecting brake shoe return with resulting brake shoe dragging or possible brake lockup. This is especially true for disc brakes since only slight pressures are required to effect engagement of a brake shoe with a disc.

Therefore, it is an object of this invention to provide a diaphragm cap which will have means for relieving pressure build up in a master cylinder reservoir.

Other objects of this invention will become apparent to those skilled in the art from the following description with reference to the drawings wherein:

FIGURE 1 is a partial sectional view of a cap and master cylinder assembly;

FIGURE 2 is a top view of assembly of FIGURE 1;

FIGURE 3 is a view taken along section line 3—3 of FIGURE 2;

FIGURE 4 is a view of a hold-down member;

FIGURE 5 is a partial sectional view of another cap and master cylinder assembly;

FIGURE 6 is a top view of the assembly illustrated in FIGURE 5; and

FIGURE 7 is a sectional view taken along line 7—7 of FIGURE 6.

Referring to FIGURES 1–4, there is illustrated a master cylinder casting 10 comprising a reservoir defined by a rectangularly shaped peripheral wall 11. The reservoir is separated into two fluid chambers 12, 14 by an inner wall 16 and boss 17 integral with the wall 16. A longitudinal portion 18 of the master cylinder has a longitudinal bore with a pair of pressure producing plungers (not shown) slidably mounted therein. Outlet ports 20 and 22 may be each communicated to a pair of wheel cylinders and compensating ports 24, 26 and replenishing ports 28, 30 communicate reservoir fluid chambers 12 and 14 with their respective fluid chambers of the longitudinal bore. The plunger construction within the longitudinal housing may be of the same construction which is disclosed in U.S. Patent No. 3,149,468.

The master cylinder 10 is provided with a rectangularly shaped cap 32 comprising a cover 34, a resilient metal hold-down member 36 and a sealing member 38. The cover 34 comprises a peripheral wall 40 extending upwardly from a peripheral flange 42 and a top plate 44 integral with the peripheral wall 40 defining a cavity 46 therein. The sealing member 38, preferably of rubber, bridges the entire cavity 46 and the resilient hold-down 36, preferably metal, is interposed between the sealing member 38 and the flange 42 of the cover 34. The sealing member 38 has a pair of flexible elements, one for each fluid chamber, each of which comprises an annular U-shaped portion 48 integral with the main base portion 50 of the sealing member and integral with a disc-shaped portion 52 which is substantially coplanar with the main base portion 50 and spaced therefrom by an annular recess defined by the U-shaped portion 48. The flexible elements are each of thinner rubber material than that of the main base portion 50. The hold-down member 36 has a peripheral gasket portion 54 which substantially coincides with the peripheral flange 42 of the cover 34 and an intermediate portion 56 corresponding to the location of the inner wall 16 and dividing the hold-down member into two openings, each of which receives an annular U-shaped portion 48 therethrough. A pair of resilient legs 58 extend from the intermediate portion 56 and engage the bottom surface of the top plate 44. The height of the legs 58 is such that they will be spread upon connecting the cap to the reservoir to provide a force on the central portion 60 of the sealing member main base portion 50 to sealingly engage the same with the end surface of the wall 16 and boss 17. The hold-down member may be secured to the cover by any well known means, such as by spot welding. A pair of detents 62 extend from the cover 34 and pass through a respective notch 64 of the hold-down member and a slot 66 of the sealing member 38 to retain the sealing member with the cover.

The cover 34 of the cap has a boss 68 having an opening 70 for receiving a bolt 72. The bolt 72 extends through aligned central openings 74 and 76 of the hold-down member 36 and sealing member 38, respectively, and into the threaded opening 78 of the boss 17. The bolt 72 has an interference fit with the opening 76 of the sealing member 38 for the purpose of retaining the bolt with the cap when the cap is removed from the master cylinder. A flat washer 84 is interposed between the head 86 of the bolt 72 and is adapted to seat on the boss when the cap is secured to the master cylinder. Two parallel flanges 88 depend from the peripheral flange 42 and serve as a locator for the cap on the reservoir and also serve as a stiffener for the cap. A pair of indentations 90 are located on the flange 42 and a pair of indentations 92 are located in the gasket portion 54 and project into a respective indentation 90. The indentations provide a space for receiving a portion 94 of the base portion 50 of the sealing member which bridges the indentations. The space between the indentations and the bridging portion 94 of the sealing member also provides a vent for the cavity 46 of the cover 34.

When the cap is secured to the reservoir by screwing the bolt 72 in the threaded opening 78 of the boss 17, the resilient legs 58 of the hold-down member are spread thereby biasing the central portion 60 of the sealing member 38 against the top edge of the wall 16 and boss 17 due to the force of the intermediate portion 56 of the hold-down member bearing thereon. The peripheral flange 42 of the cover 34 will press the peripheral edge 54 of the hold-down member and the peripheral edge of the main base portion 50 of the sealing member 38 against the top edge of the peripheral wall 11 of the reservoir. The pressure of the flange 42 acting on the sealing member is capable of keeping the bridging portion 94 of the sealing member in sealing engagement with the end of the wall 11 until a pressure of 2 to 5 p.s.i. is built up in the fluid chambers 12 or 14. Therefore, the fluid chambers 12 and 14 will be sealed from each other and from the cavity 46 and thus are sealed from the atmosphere and are free from outside contaminates. Upon brake fluid leaving the fluid chambers 12 and 14, the flexible elements will move into their respective chambers to fill the void created by brake fluid leaving their respective fluid chambers. This is accomplished by the deformation of the U-shaped portion 48 as shown in the dotted line position in chamber 14. Of course, the position of the disc-shaped portion 52 will depend upon the amount of fluid leaving their respective fluid chambers. If air gets into the hydraulic system, the air will work its way out of the system into the reservoir. Since the reservoir is sealed from the atmosphere, pressure will build up in the reservoir which could result in pressure being maintained on the hydraulic system possibly effecting either brake shoe dragging or lockup. However, the portion 94 of the sealing member acts as a relief valve when pressure builds up to 2 to 5 p.s.i. in one of the chambers by being forced off the end of the wall 11 into the confines of its respective indentation to communicate that chamber to the atmosphere.

The hold-down member 36 may be built without a gasket portion 54. In this case, the sealing member would directly engage the flange 42 of the cover 34.

Referring to FIGURES 3–6, there is illustrated a master cylinder casting 110 comprising a reservoir 112 defined by an annular wall 114.

A longitudinal portion 116 of the master cylinder has a longitudinal bore and a plunger (not shown) slidably mounted therein. An outlet port 118 may be communicated to a plurality of wheel cylinders of a brake and a compensating port 120 and a replenishing port 122 communicate the reservoir 112 with the fluid chamber of the longitudinal bore. The plunger construction within the longitudinal portion 116 may be of any well known construction.

The master cylinder 110 is provided with a round cap 124 comprising a cover 126 and a sealing member 128. The cover 126 comprises an annular wall 130 extending upwardly from an annular flange 132, and a top plate 134 integral with the annular wall 130 to define a cup shaped cavity 136 therein. An annular threaded flange 138 extends from the flange 132 for the purpose of threadedly securing the cap to the wall 114 of the reservoir 112. The sealing member 128, preferably of rubber, bridges the entire cavity 136 and comprises an annular main base portion 140 and a flexible element comprising an annular U-shaped portion 142 integral with the main base portion 140 and integral with a disc-shaped portion 144. The disc-shaped portion 144 is co-planar with the main base portion 140 and spaced therefrom by an annular recess defined by the U-shaped portion 142. The flexible element is made of thinner rubber material than that of the base portion 140. A vent 146 is provided in the top member 126 for communicating the cavity 136 to the atmosphere. An indentation 148 is located on the flange and provides a space for receiving a portion 150 of the base portion 140 of the sealing member which bridges the indentation 148.

When the cap is secured to the reservoir 112, the bottom surface of the flange 132 will bear against the top surface of the main base portion 140 to press the same against the end surface of the reservoir wall 114. The pressure of the flange 132 acting on the sealing member is capable of keeping the bridging portion 150 of the sealing member in sealing engagement with the end of the wall 114 until a pressure of 2 to 5 p.s.i. is built up in the fluid chamber. Therefore, the reservoir 112 is sealed from the cavity 136 and from the atmosphere and thus is free from outside contaminates. Upon brake fluid leaving the reservoir 136, the flexible elements 142, 144 will move into the chamber to fill the void created by brake fluid leaving the reservoir. If pressure builds up to 2 to 5 p.s.i. in the fluid chamber 112, the bridging portion 150 will lift off the end of the wall 114 into the confines of the indentation 148, communicating the chamber to the threaded flange 138 and thus to atmosphere since the threaded connection between the flange 138 and the reservoir wall 114 is not fluid tight.

We claim:
1. The combination of a cap and master cylinder: said master cylinder comprising at least one reservoir chamber, wall means enclosing and defining said chamber, said wall means having an end edge, a flexible sealing member bridging said chamber and engaging said end edge of said reservoir wall means, said cap having located thereon a generally flat surface opposite said end edge of said reservoir wall means for pressing said sealing member into sealing engagement with said end edge, at least one interruption in said flat surface of said cap providing space for receiving therein a portion of said sealing member which bridges said space, said space being constructed to communicate said chamber with the exterior thereof when said sealing member portion lifts off said end edge of said wall into the confines of said space, and means connecting said cap to said master cylinder.

2. The combination of a cap and master cylinder: said master cylinder comprising at least one reservoir chamber, wall means enclosing and defining said chamber, said wall means having an end edge, a flexible sealing member bridging said chamber and engaging said end edge of said reservoir wall means, said cap having located thereon a generally flat surface opposite said end edge of said reservoir wall means for pressing said sealing member into sealing engagement with said end edge, at least one indentation in said flat surface of said cap, a portion of said sealing member which is opposite said indentation bridging said indentation, said indentation being constructed to communicate said chamber with the exterior thereof when said sealing member portion lifts off said end edge of said wall into the confines of said indentation, and means connecting said cap to said master cylinder.

3. The combination of a cap and master cylinder comprising: said master cylinder comprising a peripheral wall defining a fluid reservoir, an inner wall separating said reservoir into a pair of fluid chambers, said peripheral wall having an end edge, a flexible sealing member bridging said chambers and engaging said end edge of said peripheral wall, said cap having located thereon a generally flat surface opposite said end edge of said peripheral wall for pressing said sealing member into sealing engagement with said end edge, two indentations in said flat surface of said cap, portions of said sealing member which are opposite a respective one of said indentations bridging said indentation, each of said indentations being located and constructed to communicate a respective one of said chambers with the exterior of said reservoir when its respective sealing member portion lifts off said end edge of said wall into the confines of its respective indentation, and means connecting said cap to said master cylinder.

4. The combination of a cap and master cylinder: said master cylinder comprising a peripheral wall defining a fluid reservoir, an inner wall separating said reservoir into a pair of fluid chambers, said walls having an end edge, said cap having cavity means therein and a peripheral generally flat flange surrounding said cavity means and of the same general configuration as said peripheral wall, a flexible sealing member bridging said chambers and said cavity means and engaging said end edges of said walls, a resilient member carried by said cap acting on said sealing member to press the same into sealing engagement with the end edge of said inner wall, two indentations in said flat flange of said cap located on opposite sides of said inner wall, said indentations communicating said cavity means to atmosphere, the portions of said sealing members which are opposite a respective indentation bridging their respective indentations, whereby each of said chambers will be communicated to atmosphere when its respective said portion of said sealing member lifts off the end edge of said peripheral wall into the confines of its respective indentation.

5. The combination of a cap and master cylinder: said master cylinder comprising a peripheral wall defining a fluid reservoir, an inner wall separating said reservoir into a pair of fluid chambers, said walls having an end edge, said cap having cavity means therein and a peripheral generally flat flange surrounding said cavity means and of the same general configuration as said peripheral wall, a flexible sealing member bridging said chambers and said cavity means and engaging said end edges of said walls, a resilient member carried by said cap acting on said sealing member to press the same into sealing engagement with the end edge of said inner wall, said resilient member having a generally flat portion of the same general configuration as said flange and located between said sealing member and said flange, two indentations in said flat flange of said cap located on opposite sides of said inner wall, two indentations in said flat portion of said resilient member each received in a respective one of said flange indentations, said indentations communicating said cavity means to atmosphere, the portions of said sealing members which are opposite a respective indentation of said resilient member bridging their respective indentations, whereby each of said chambers will be communicated to atmosphere when its respective said portion of said sealing member lifts off the end edge of said peripheral wall into the confines of its respective indentation, and means for connecting said cap to said master cylinder.

6. The combination of a cap and master cylinder: said master cylinder comprising an annular wall defining a reservoir chamber, said wall having an end edge, an annular flexible sealing member bridging said chamber and engaging said end edge of said wall, said cap having located thereon a generally flat surface opposite said end edge of said wall for pressing said sealing member into sealing engagement with said end edge, at least one indentation in said flat surface of said cap, a portion of said sealing member which is opposite said indentation bridging said indentation, said indentation being constructed to communicate said chamber with the exterior of said reservoir when said sealing member portion lifts off said end edge of said wall into the confines of said indentation, and means connecting said cap to said master cylinder.

7. A cap for use with a master cylinder reservoir comprising: said cap having cavity means therein and a peripheral generally flat flange surrounding said cavity means, a flexible sealing member bridging said cavity means, at least one interruption in said flat flange of said cap providing space for receiving therein a portion of said sealing member which bridges said space to open the area of said reservoir underlying said sealing member through said interruption to surrounding atmosphere.

8. A cap for use with a master cylinder reservoir comprising: said cap having cavity means therein and a peripheral generally flat flange surrounding said cavity means, a flexible sealing member bridging said cavity means, a resilient member carried by said cap and interposed between said cap and sealing member acting on said sealing member for biasing in a direction away from said cap a portion of said sealing member which extends between two opposite points of the periphery of said sealing member, two indentations in said flange of said cap located on opposite sides of said portion of said sealing member, the portions of said sealing members which are opposite a respective indentation of said resilient member bridging their respective indentations, said indentations communicating said cavity means to atmosphere.

9. A cap for use with a master cylinder reservoir comprising: said cap having cavity means therein and a peripheral generally flat flange surrounding said cavity means, a flexible sealing member bridging said cavity means, a resilient member carried by said cap and interposed between said cap and sealing member acting on said sealing member for biasing in a direction away from said cap a portion of said sealing member which extends between two opposite points of the periphery of said sealing member, said resilient member having a generally flat portion of the same general configuration as said flange of said cap and located between said sealing member and said flange of said cap, two indentations in said flange of said cap located on opposite sides of said portion of said sealing member, two indentations in said flat portion of said resilient member each received in a respective one of said flange of said cap indentations, the portions of said sealing members which are opposite a respective indentation of said resilient member bridging their respective indentations, said indentations communicating said cavity means to atmosphere.

10. A cap for use wth a master cylinder reservoir, said cap having a cavity means therein and a peripheral generally flat flange surrounding said cavity means, a flexible sealing member underlying said cap and bridging said cavity means, at least one indentation in said flange of said cap to open said cavity means above said sealing member between it and said cap to surrounding atmosphere, the portion of said sealing member which is opposite said indentation of said flat flange of said cap bridging said indentation to seal said master cylinder reservoir, said portion being movable into said indentation to communicate said master cylinder reservoir to atmosphere whenever pressure in said master cylinder reservoir rises above atmospheric pressure in said cavity.

11. A cap for use with a master cylinder reservoir, said cap having a cavity therein and a peripheral annular generally flat flange surrounding said cavity, said peripheral generally flat flange having at least one indentation, an annular flexible sealing member bridging said cavity and said indentation of said flange and forced by said flat flange of said cap to seal said master cylinder reservoir about an edge of a chamber thereunder, said annular flexible sealing member bridging said indentation being of sufficient width to flex upwardly upon the creation of a pressure in said chamber of said master cylinder reservoir above atmospheric pressure in said cavity.

References Cited
UNITED STATES PATENTS

| | | | |
|---|---|---|---|
| 2,424,801 | 7/1947 | Crabbe et al. | 215—56 |
| 3,173,265 | 3/1965 | Bixby | 220—44 |

THERON E. CONDON, *Primary Examiner.*

JAMES B. MARBERT, *Examiner.*